Jan. 19, 1932.  P. SEDERHOLM  1,841,919
CHUCK FOR BRACING OF TOOLS, WORK PIECES, OR THE LIKE
Filed March 20, 1928
*Fig. 1.*
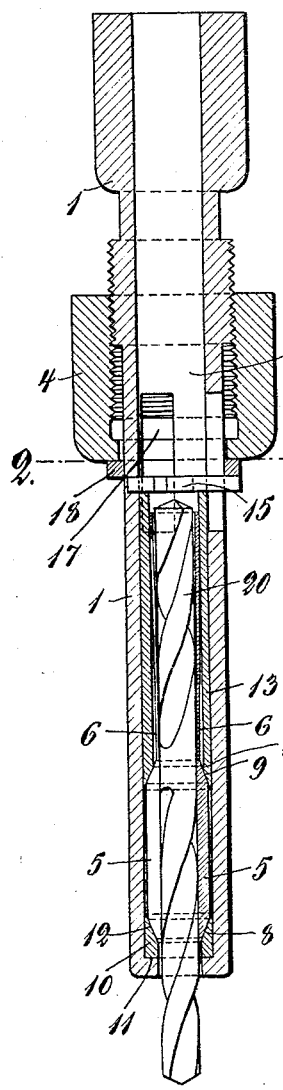
*Fig. 2.*
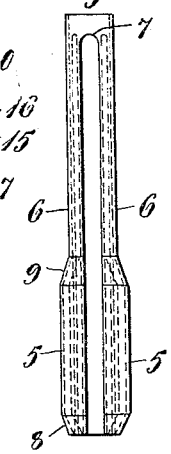
*Fig. 3.*
*Fig. 4.*
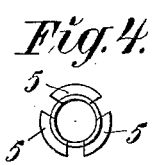
P. Sederholm
INVENTOR
By: Marks & Clerk
ATTYS.

Patented Jan. 19, 1932

1,841,919

UNITED STATES PATENT OFFICE

PER SEDERHOLM, OF STOCKHOLM, SWEDEN, ASSIGNOR TO STICKLER & MAGNUSON AKTIEBOLAG, OF STOCKHOLM, SWEDEN, A REGISTERED COMPANY OF SWEDEN

CHUCK FOR BRACING OF TOOLS, WORK-PIECES OR THE LIKE

Application filed March 20, 1928, Serial No. 263,173, and in Sweden January 2, 1928.

The present invention refers to chucks for bracing of tools, work-pieces or the like of the type provided with a number of gripping jaws disposed within the chuck and united with one another, so as to form a gripping sleeve embracing the tool, work-piece or the like, said sleeve having conical ends by which the sleeve is supported and centered in conical bearings adapted to be pressed against the ends of the sleeve by means of a clamping nut threaded onto the chuck shank. The invention has for its object to bring about accurate centering of the gripping jaws in relation to the chuck. In chucks of this kind as previously known, an accurate centering of the jaws can not be attained for the reason that the one bearing of the gripping sleeve is disposed in the clamping nut proper, which cannot be accurately centered with respect to the shank of the chuck in manufacture on a commercial scale. According to the invention, this disadvantage is avoided by both bearings being arranged within the chuck shank and centered with respect to the bore hole receiving the gripping sleeve said bore hole being itself co-axial with the chuck shank.

In such an arrangement the one bearing may consist of an internal conical bore in the chuck shank proper. With such an arrangement, however, the centering may, even if it be entirely accurate from the beginning, become more or less imperfect in the course of time, inasmuch as the bearing formed in the chuck shank is deformed by degrees through the pressure exerted by the gripping sleeve. This is so for the reason that the gripping sleeve has an exact conical shape only for a certain bracing width, whereas for smaller bracing widths it will have an angular shape so as to be apt to wear and deform the conical supporting surface in the bearing. This disadvantage is particularly prominent with the use of gripping sleeves having a large bracing capacity.

The last-mentioned drawback is obviated according to the invention, in that the bearings of the gripping sleeve are made in the form of rings or sleeves of tempered steel inserted into the bore of the chuck shank and centered therein.

The invention will be described more fully with reference to the accompanying drawings, which illustrates an embodiment of a chuck designed in accordance with the invention.

Fig. 1 shows an axial section of the chuck and the gripping sleeve inserted therein, and Fig. 2 is a section on line 2—2 in Fig. 1. Fig. 3 is an elevation and Fig. 4 an endwise view of the clamping sleeve.

The chuck as shown in the drawings is primarily intended for twist drills. The said chuck comprises a cylindrical shank 1, a gripping sleeve 3 inserted into a cylindrical bore 2 co-axial with the shank, and a clamping nut 4 threaded onto the shank. In the example shown, the gripping sleeve consists of three jaws 5 provided with axial extensions 6 which form resilient arms united with each other at the inner end 7 of the sleeve. Preferably, the gripping sleeve is made in its entirety out of a single piece, which is turned and bored and split up so as to obtain the shape shown in Figs. 3 and 4. The jaws 5 are somewhat thicker than the tubular shank formed by the arms 6, and are conically beveled at the ends 8 and 9. The gripping sleeve is mounted with its outer end 8 in a ring 10 of tempered steel inserted into the outer end of the chuck shank, said ring bearing on the one side on an inner abutment 11 in the chuck handle and being on the other side provided with a conical supporting surface 12, by which the fore end of the gripping sleeve is accurately centered with respect to the chuck shank, the ring 10 fitting accurately to the bore in the shank. In a similar manner, the gripping sleeve bears with its inner conical end 9 against a bearing sleeve 13 inserted into the chuck shank and fitting accurately to the bore thereof, said bearing sleeve 13 being provided with a conical surface 14, against which the inner end of the gripping sleeve is bearing so as to be properly centered. The sleeve 13 is so long as to entirely surround the tubular shank of the gripping sleeve, and extends somewhat outside the inner end of the said shank. The purpose of this is to facilitate transfer, from the clamping nut 4 through the sleeve 13, of the axial force required to press the gripping sleeve together. The transfer of the axial pressure from the nut is mediated by a star-shaped plate 15 bearing against the inner end of the sleeve 13, said plate being provided with arms 16 extending outwardly through rectangular openings 17 in the wall of the chuck shank. Provided between the said plate and the nut 4 is a ring 18 thrust on the chuck shank and bearing against the ends of the arms 16 of the plate. The said plate is provided with a central bore hole 19 for the drill 20. In tightening the nut 4 for the purpose of bracing the drill the jaws 5 will obviously be pressed against the drill which is thus held steadily in a centered position.

On account of the resiliency of the arms 6 the bracing width of the jaws may be altered within wide limits while maintaining a close contact with the drill along their whole length of the the jaws. Therefore, the chuck may be used with one and the same gripping sleeve for drills of diameters varying within wide limits, for instance diameters varying between 1 and 4 or between 4 and 8 millimeters. The conical surfaces of the ends 8, 9 of the gripping sleeve may, for instance, be accurately conical for the greatest bracing width, the ends of the gripping sleeve then obviously obtaining an angular shape for the smallest bracing width. For this reason the bearing sleeves 10, 13 are preferably made of tempered steel, as stated, although the invention is evidently not limited to such an embodiment. Thus, with the use of gripping sleeves with a clamping range varying within comparatively narrow limits, the bearing sleeve 10 in the outer end of the chuck may, for instance, be dispensed with and replaced by a conical bore in the chuck shank proper.

I claim:

1. A chuck comprising in combination a rotatable chuck shank provided with a bore coaxial with the axis of rotation of the shank, two tubular members of tempered steel closely fitting the bore and formed with conical coaxial bearing surfaces opposite to each other, a gripping sleeve composed of a number of gripping jaws formed with bevelled ends adapted to be engaged by said conical bearing surfaces, and means for forcing one of said tubular bearing members towards the other so as to clamp the gripping sleeve between the conical bearing surfaces.

2. A chuck comprising in combination a rotatable chuck shank provided with a bore coaxial with the axis of rotation of the shank, an inner tubular bearing member closely fitting the bore and formed at its outer end with a conical coaxial bearing surface, an opposite conical bearing arranged within the chuck shank coaxially with said bore, a number of separate gripping jaws formed with bevellel ends resilient arms extending longitudinally from said jaws and connected together at their outer ends, radial arms associated with said inner tubular bearing member and extending through longitudinal slots in the chuck shank, and means arranged outside the chuck shank for applying axial pressure through the medium of said radial arms to said inner tubular bearing member so as to engage the beveled ends of said jaws and thereby to clamp the jaws together radially.

In testimony whereof I affix my signature.
PER SEDERHOLM.